Patented Dec. 9, 1930

1,784,523

UNITED STATES PATENT OFFICE

ERNEST HOPKINSON, OF NEW YORK, N. Y.

METHOD OF RUBBERIZING FIBROUS MATERIAL AND ARTICLE PRODUCED THEREBY

No Drawing.   Application filed June 21, 1924.   Serial No. 721,591.

This invention relates to a method of rubberizing fibrous material, more particularly to a method of rubberizing by coating without impregnation, and to the article produced, and is a continuation in part of my co-pending application Serial No. 588,494, filed September 15, 1922.

For many years it has been common in the rubber art to rubberize fibrous material such as woven, knitted, felted or otherwise formed sheets, or leather, or articles made therefrom, in various ways, as by calendering, spreading, spraying or dipping, using for this purpose rubber doughs, cements, and also latex in substantially the concentration in which it is obtained from the trees. The rubberized sheet may be used in sheet form or cut and plied up or otherwise joined in the making of various articles such as tires, hose, belting, waterproofed clothing, gloves, footwear, etc. When coating with a material such as the previously employed solutions of milled or broken-down rubber in organic solvents, or latex in substantially its natural concentration, the coating material strikes through or impregnates the sheet or other article in varying degree depending on the conditions. As a result the flexibility of the sheet or article is lessened, due to the bonding together of the fibres or threads of the material by the rubber deposited in its interstices. It has also been found that material rubberized on one side by the use of thin latex deteriorates more rapidly than a sheet of rubber alone, the theory advanced in explanation of this being that the side of the rubber next to and penetrating the fibrous material has a much greater area exposed to oxidation through air entering the material than in the case of a plain rubber sheet, and this appears to be substantiated by the fact that in the case of double texture proofed goods, in which there is fibrous material on both sides of the rubber, the deterioration is more rapid than in the case of single texture material. In addition latex in its natural concentration or as heretofore compounded for spreading has been of such fluidity that it cannot be successfully used on the usual types of spreader machines at present employed for spreading rubber doughs. Another disadvantage is that when ordinary latex or rubber cement is being used for coating, more particularly when the coating is to be applied by a dipping or spraying operation, the deposit of rubber obtained on the material is relatively thin, and where a heavier coating is desired the operation must be repeated, involving considerable loss of time and labor in drying the material between dips.

For certain articles of manufacture the above-mentioned striking through or impregnation of the fibrous material may not be objectionable and may even be particularly desirable. For instance in the case of tires, the great strength and resistance to stripping obtained by impregnation with latex is an advantage, and as the fibrous material in the tire is completely encased in rubber, the comparatively rapid ageing which occurs in rubberized fibrous material having its fibres exposed to the air does not occur. Moreover, as the tire casing is comparatively stiff by reason of being built up of numbers of layers of fabric and rubber and is not required to flex except under relatively great pressure as compared for instance to rubberized clothing, the loss in flexibility due to the impregnation of the material is relatively small and not objectionable.

In many rubberized articles, however, the impregnation of the fibrous material and the results thereof are highly objectionable. For instance, in the case of proofed sheets which are to be used in that form or that of waterproofed clothing, rubberized fabric gloves, bathing shoes, light overshoes, and many other articles, the loss in flexibility is a serious defect, and where the fibrous material is directly exposed to view the appearance may be seriously affected. The comparatively rapid ageing is also obviously a defect in such cases. Moreover, when articles are rubberized as a whole by the dipping method there is serious objection to the use of the ordinary cements made from milled or broken-down rubber for this purpose. Due to the extremely high viscosity of cements containing a relatively small amount of rubber, it is necessary to use a rather thin cement for the dipping operation with the result that only a very thin coat of rubber can be applied by a single operation, and there is the additional objection of the loss, fire risk, and injury to the health of the operatives, by reason of the use of volatile organic solvents. Moreover, the milled or broken-down rubber deposited from such solvents is lacking in the strength possessed by the natural latex rubber and it does not as firmly unite with the fibres of the material.

An object of my invention is to provide a simple and economical process for coating articles of fibrous material, whether in sheet or other form, with vulcanizable material.

Another object is to provide a coating method capable of making relatively heavily rubberized articles with a minimum number of coating operations.

Still another object is to provide a method of latex rubberizing fibrous material which is capable of being successfully carried out by the use of the present types of spreading machines employed for spreading doughs made from milled and broken down rubber.

Still another object is to provide a method for rubberizing fibrous articles by the use of rubber latex in a thickened form without substantial penetration of the material.

A further object is to provide a method for rubberizing fibrous articles with a minimum loss of flexibility.

A still further object is to provide a superficially rubberized fibrous article having the qualities of cheapness, flexibility, strength, age and wear resistance, and water tightness.

The invention consists broadly in coating a fibrous material with a strongly adhering but substantially superficial covering of rubber in the form of a water dispersion, and curing. The invention also includes the article produced, having the properties of flexibility, age and wear resistance, cheapness and strength.

In the carrying out of the invention any suitable fibrous material may be used, such as woven or knitted fabric, weftless cord fabric, felted material, or other fibrous material such as leather, either in sheet or other form. Various rubber latices may be used, the latex most frequently employed being that of *Hevea brasiliensis*, and an artificial water dispersion of rubber is also applicable. The latex as obtained from the trees or plants varies considerably in its solid content, due to the variety and age of the plant or tree, conditions of soil and climate and other variables, but in the case of Hevea latex from 30 to 35% solid content may be taken as a fair average. By my invention the latex or other water dispersion of rubber is first treated to obtain it in a thickened, more or less plastic form, as by concentrating, physical or chemical thickening of the latex by the use of certain agents, compounding, or by a combination of any two or all of these methods. The latex may be concentrated in any desired manner, for instance as disclosed in patent to McGarack No. 1,523,821, Jan. 20, 1925. The degree of thickening required will depend on a number of conditions, such as the character of the fibrous material to be treated, the nature of the particular latex or other dispersion used, the thickness of the coating desired, the manner in which it is to be applied, and other variables. I have found that by using such a thickened latex or dispersion for the coating it may be applied without substantial penetration of the fibrous material, and in all cases, irrespective of the method used for the thickening or for applying the coating, the consistency of the latex or dispersion or its compound should be such that substantial penetration of the fibrous material will not occur.

In one example of the invention, for coating by spreading with a latex thickened by concentrating and compounding, rubber latex, the natural water emulsion of rubber obtained from the rubber trees, previously concentrated to 50% of solid constituents by weight, is combined with various types of mineral fillers, softeners, vulcanizing ingredients, possibly stabilizing agents, etc. A specific compound is as follows:

100 parts of dry rubber by weight (as concentrated latex containing say 50% rubber by weight)
200 parts of whiting by weight
10 parts of zinc oxide by weight
4 parts of sulphur by weight
10 to 25 parts of spindle oil by weight
5 parts of glue
5 to 12 parts of 2% soap solution by weight The latex employed contains about 1 to 3% of ammonia, which is ordinarily used as a preservative agent to prevent coagulation upon shipment of latex from its source to a distant consumer. The above combination is made as follows: The spindle oil is emulsified in one-half its volume of a 2% soap solution with constant stirring. Thereafter the glue in the form of a 50% water solution is added. The glue stabilizes the oil emulsion, and the whiting, zinc oxide and sulphur may now be added. The mixture is then thoroughly incorporated by passing it through a paint or paste mill of an ordinary type and from which it is then allowed to drop directly as it issues from the mill into the concentrated rubber latex, the latter being stirred continuously during the mixing.

The mass thickens on standing after a few hours, which is an advantage in the spreading operation. The compound as so prepared is ready to be spread. This operation consists in laying a thin layer of the mixture so prepared on a continuous web of cloth or other material by means of the usual spreading machine and drying it more or less thoroughly, after which if desired a second layer may be applied in the same way. The cloth so coated is then dried. By slightly increasing the temperature ordinarily employed for drying spread goods prepared from rubber cements or doughs or by slightly increasing the length of the heating coil, the speed of the coating operation may be maintained at substantially the same rate as that employed in the usual spreading process employing rubber cements or doughs. Such a coated cloth may be vulcanized by painting or spraying it with a solution of a vulcanizing mixture, for example a mixture containing 0.5 parts of zinc butyl xanthogenate and 0.4 parts of dibenzyl amine dissolved in 100 parts of carbon tetrachloride may be applied to the cloth by painting or spraying. The spread cloth so painted or sprayed is allowed to stand for one-half to one hour. The coated fabric is then heated for one hour at 212° F. at the end of which time vulcanization is accomplished. The proportions of vulcanization accelerators used may of course be increased if desired.

It will be observed in carrying out the above procedure that latex containing approximately 50% of solid content has been employed. It will be obvious however that latex of variable solid content may be used instead of that given in the preferred example. Latex containing 65% of solid matter has been employed to give good results. Concentrated latex of much lower viscosity than the doughs and cements ordinarily used for spreading and dipping has a very much higher proportionate rubber content, hence where a relatively thick coating is desired it may be obtained with fewer coating operations.

Although the process has been described including the application of a vulcanizing agent after spreading the latex, it will be observed that vulcanizing ingredients may be incorporated in the latex prior to its application. A typical compound which may be spread including vulcanizing ingredients adapted to accomplish vulcanization is:

```
100  parts by weight of rubber (as rubber latex containing 50% solid content)
100  parts by weight of lithopone
10   parts by weight of zinc oxide
4    parts by weight of sulphur
0.5  parts by weight of ultramarine blue
3    parts by weight of aniline
3    parts by weight of potassium butyl xanthogenate
```

The compound is spread and dried as heretofore described and vulcanization is accomplished by allowing it to stand at approximately 70° F. for one week. The time for vulcanization may be decreased by increasing the quantities of accelerating agents. If desired the above formula can be altered by replacing the butyl xanthogenate by the condensation product of ethylamine formaldehyde.

Another method of vulcanization which may be employed consists in painting or spraying one or more of the vulcanizing ingredients subsequent to spreading and then exposing the spread material so treated to another vulcanizing ingredient. For example, oxy normal butyl thiocarbonic acid disulphide in carbon tetrachloride may be painted or sprayed on the fabric, dried and the coated material exposed to aniline vapor for one hour, whereupon vulcanization is secured.

It will be understood that the temperature of vulcanization employed may be varied in accordance with the compound vulcanized. Ordinary room temperature—approximately 70° F.—or other temperatures above, below or at the normal hot vulcanization temperature may be employed. By the hot normal vulcanization temperature is meant temperatures lying approximately between 240–286° F.

Any of the fabrics so prepared may be used to produce a single ply fabric, or two fabrics coated by any of the methods may be placed face to face to form two ply fabric in the regular way.

As another example of a compound for coating by spreading, but with a latex thickened and stabilized by concentrating, compounding and treatment with a specific thickening and stabilizing agent, the following is given:

```
100   parts rubber (as 60% solids latex)
100   parts lithopone
75    parts barytes
10    parts glue
7     parts ammonium stearate (dry basis)
0.5   part ultramarine blue
1     part zinc oxide
3     parts sulphur
0.5   part zinc dimethyl-dithio carbamate
```

This compound may be vulcanized in air in two hours at 212° F. In the above compound the ammonium stearate acts as a thickening and stabilizing agent.

As a further example of a compound for coating by dipping with a latex thickened by concentrating the following is given:

```
Rubber (as 60% latex) _____ 100
Sulphur _____ 4
Zinc oxide _____ 0.5
Zinc dimethyl-dithio carbamate _____ 0.5
```

The above compound is suitable for rubberizing fibrous material by dipping, such as sheet fabric, or articles built up or otherwise formed of fibrous material, such as fabric gloves, bathing shoes, boots, overshoes, and many other articles. One way of making such articles as gloves, overshoes, bathing shoes, etc., is by stretching a woven or knitted lining over a form and then dipping in the above-mentioned compound, or instead the lining may be made by building up cut-to-shape parts and joining them and then dipping as before. There is a considerable field of use in the arts for a rubberized fabric glove of sufficient flexibility to permit ready handling of materials by the wearer. Such gloves may be used in chemical plants for the handling of corrosive materials, and in any other place where a durable and waterproof glove is desired. Articles coated with the last-mentioned compound may be cured in about one-half hour at a temperature of 250° F. If desired, however, the vulcanizing and accelerating ingredients may be omitted and an unmixed concentrated latex used instead. After coating the article with the unmixed latex it may then be cured by a suitable curative such as sulphur chloride, nitrogen sulphide $N_4S_4$, or other suitable combinations, preferably those vulcanized at a comparatively low temperature, and when necessary the cure may be accomplished by the use of hot air, steam, or hot glycerine.

In certain cases it may be desired to rubberize without impregnation loosely aggregated fibrous material or relatively wide mesh woven or knitted fabric, and in other cases it may be desired to coat with a relatively thin or uncompounded latex. In this event, as an aid in preventing penetration or impregnation, the material may first be waterproofed to a certain extent or rendered water-repellent in any suitable manner. For example, an initial layer of cement having the following constitution may be applied to the cloth:—rubber 100 parts, lithopone 60 parts, zinc oxide 10 parts, sulphur 3 parts, paraffin 1 part, dissolved in 400 parts of gasoline. After the application of this initial layer, the latex may be applied without danger of penetration. However, the material may be rendered waterproof or water-repellent in any other suitable manner. It is obvious that if desired the material may be treated in a similar manner in any of the previously given examples.

The process is an economical one, eliminating as it does expensive, inflammable and toxic solvents such as solvent naphtha, gasoline, etc., heretofore employed in cements. The process employing latex furthermore possesses the advantage that the rubber coating is made up of material which has not been subjected to the ordinary washing and milling processes usually employed in the preparation of rubber for the production of rubber cements, and it further contains all the solid constituents of the latex. Such latex rubber is of superior strength and is very strongly bonded to the fibrous material, hence, even though by the present coating method the fibrous material is not substantially penetrated or impregnated, the bond between the coating and material is still a strong one with a resistance to stripping equal or superior to that obtained by the usual coating of such material with rubber doughs or cements. By reason of the non-penetration of the fibrous material rubberized sheets and other articles are produced having a maximum flexibility and resistance to ageing, and these qualities are particularly valuable in the low cost production of many light rubberized fabric articles such as waterproof clothing, aprons, hospital sheeting, waterproof bags, footwear, gloves, and many other articles. The invention is also applicable to the coating of belting and fabric hose, in order to prevent their injury when exposed to the action of chemicals, and also to increase their durability and strength.

While specific embodiments of the invention have been described, it is obvious that it is capable of wide application and I therefore do not wish the invention to be limited otherwise than as set forth in the appended claims.

Having thus described my invention what I claim and desire to protect by Letters Patent is:

1. The method of making rubberized articles of fibrous material which comprises coating normally penetrable fibrous material with a thickened water emulsion of rubber without substantial penetration of the material, and drying, thereby attaining a minimum loss of flexibility.

2. The method of making rubberized articles of fibrous material which comprises superficially coating normally penetrable fibrous material with a thickened and compounded water emulsion of rubber without substantial penetration of the material, and drying, thereby attaining a minimum loss of flexibility.

3. The method of making rubberized articles of fibrous material which comprises coating normally penetrable fibrous material without substantial penetration thereof, with latex thickened by concentration, and drying the article, thereby attaining a minimum loss of flexibility.

4. The method of making rubberized articles of fibrous material which comprises coating normally penetrable fibrous material with latex of 50% or higher concentration, and drying, thereby attaining a minimum loss of flexibility.

5. The method of making rubberized articles of fibrous material which comprises coating normally penetrable fibrous material without substantial penetration thereof with latex thickened by concentration and compounding, and drying the article, thereby attaining a minimum loss of flexibility.

6. The method of making rubberized fabric articles of manufacture which comprises relatively thickly covering normally penetrable fabric, without substantial penetration thereof, by a single coating operation with concentrated latex containing low temperature curing ingredients, and curing, thereby attaining a minimum loss of flexibility.

7. The method of making rubberized fabric articles of manufacture which comprises relatively thickly covering normally penetrable fabric by a single coating operation with concentrated and compounded latex without substantial penetration of the fabric interstices, and drying, thereby attaining a minimum loss of flexibility.

8. The method of making rubberized fabric articles of manufacture which comprises forming on a normally penetrable fabric, a relatively thick and uniform wear and waterproof covering of rubber thereon by a single spreading operation with concentrated and compounded latex without substantial penetration of the fabric interstices, and curing at a temperature below the normal heat cure, thereby attaining a minimum loss of flexibility.

9. The method of making rubberized articles of manufacture which comprises superficially treating normally penetrable fibrous material with water repellent material to prevent substantial penetration thereof by water, then superficially coating it with a coating material embodying rubber in water dispersion, and drying.

10. The method of making rubberized articles of manufacture which comprises superficially treating normally penetrable fibrous material to render it water repellent, spreading thereon a plastic coating embodying thickened latex, and drying.

11. The method of making rubberized articles of manufacture which comprises superficially treating normally penetrable fibrous material to render it water repellent, spreading thereon a thickened plastic coating embodying thickened latex and compounding material, drying and curing.

12. A flexible article of normal penetrable fibrous material having as an immediate coating attached thereto, without substantial penetration of the material, the deposition product of a dried aqueous dispersion of rubber, said coating being uniform in character throughout its depth.

13. A vulcanized flexible and age resisting article of manufacture formed of normal penetrable fibrous material and having an immediate attached covering of the deposit from dried rubber latex and without substantial penetration of the interstices of the material, said covering being uniform in character throughout its depth.

14. A flexible article of manufacture comprising normal penetrable fibrous material having superposed, distinct and substantially superficial coatings of water repellent material and the deposit of a dried water dispersion of rubber, one of said coatings being directly in contact with the fibres.

15. A flexible article of manufacture comprising normal penetrable fibrous material having superposed, distinct and substantially superficial coatings of water repellent material and the deposit of dried rubber latex, one of said coatings being directly in contact with the fibres.

Signed at New York, county of New York, and State of New York, this 19th day of June, 1924.

ERNEST HOPKINSON.

DISCLAIMER 1,784,523.—*Ernest Hopkinson*, New York, N. Y. METHOD OF RUBBERIZING FIBROUS MATERIAL AND ARTICLE PRODUCED THEREBY. Patent dated December 9, 1930. Disclaimer filed May 20, 1939, by the assignee, *United States Rubber Company*.

Hereby enters this disclaimer to each of claims 1, 2, 3, 4, 5, 6, 7, 12, and 13 of said Letters Patent.

[*Official Gazette June 13, 1939.*]